United States Patent
Yuan et al.

(10) Patent No.: US 12,360,014 B2
(45) Date of Patent: Jul. 15, 2025

(54) PRODUCTION LINE ANALYZER AND VISUALIZER FOR LINE PERFORMANCE IMPROVEMENT

(71) Applicant: Hitachi, Ltd., Tokyo (JP)

(72) Inventors: Wei Yuan, Novi, MI (US); Yi-Chu Chang, Farmington Hills, MI (US); Lili Zheng, Novi, MI (US)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 17/976,630

(22) Filed: Oct. 28, 2022

(65) Prior Publication Data
US 2024/0142344 A1    May 2, 2024

(51) Int. Cl.
*G06F 11/30* (2006.01)
*G01M 99/00* (2011.01)

(52) U.S. Cl.
CPC .................. *G01M 99/005* (2013.01)

(58) Field of Classification Search
CPC .................................. G01M 99/005
See application file for complete search history.

(56) References Cited

U.S. PATENT DOCUMENTS

2017/0308052 A1    10/2017    Kajiyama
2022/0342401 A1*   10/2022    Dunigan ............ G05B 19/41865

* cited by examiner

*Primary Examiner* — Phuong Huynh
(74) *Attorney, Agent, or Firm* — PROCOPIO, CORY, HARGREAVES & SAVITCH LLP

(57) ABSTRACT

In example implementations described herein, there are systems and methods enabling manufacturers to become more efficient by providing a digital tool to track, visualize, quantify, and notify production bottlenecks for quick actions. Some implementations include an apparatus including a processor configured to analyze time-stamp data collected associated with a plurality of elements of an industrial process. The processor may be configured to generate, based on the analyzed time-stamp data, a color coded visualization of the industrial process, where generating the color coded visualization includes associating each of the plurality of elements of the industrial process with a corresponding color indicating a state of an element in the plurality of elements of the industrial process. The processor may further be configured to present, via a display, the generated color coded visualization of the industrial process.

17 Claims, 10 Drawing Sheets

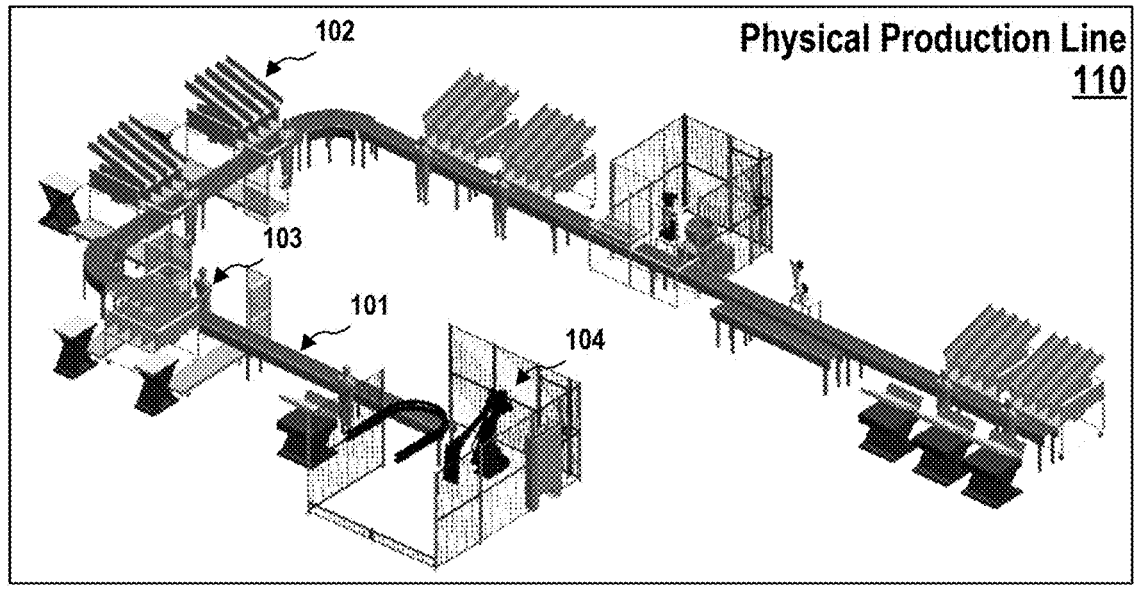
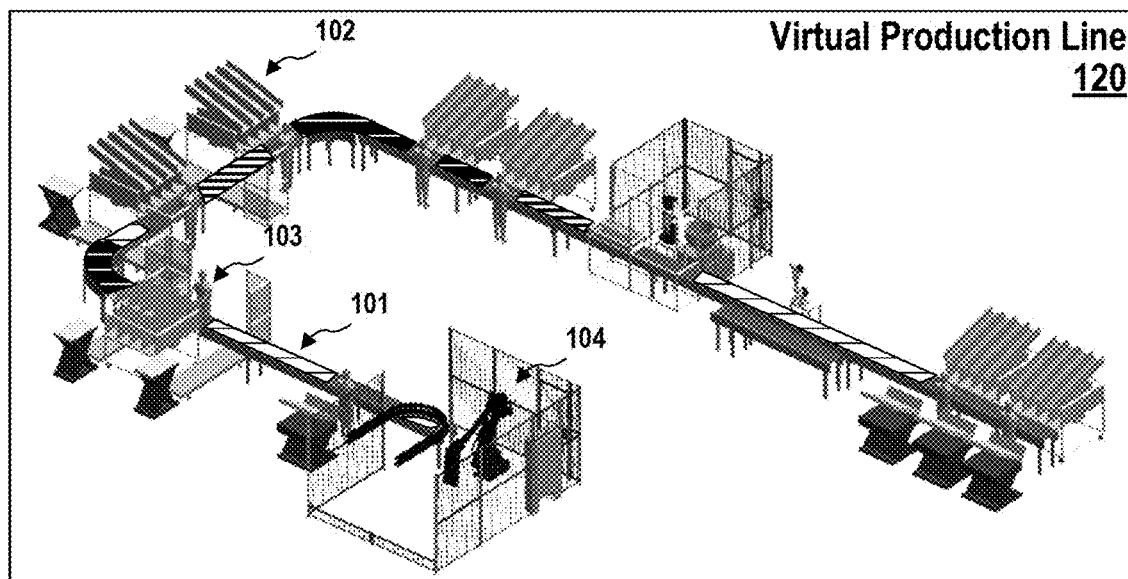
 First throughput level
 Second throughput level
 Third throughput level
FIG. 1

FIG. 7

PRODUCTION LINE ANALYZER AND VISUALIZER FOR LINE PERFORMANCE IMPROVEMENT

BACKGROUND

Field

The present disclosure is generally directed to diagnosing and optimizing industrial and or logistical systems and/or processes.

Related Art

Manufacturing, warehouses, and distribution centers may be undergoing a digital transformation (e.g., towards an "Industry 4.0"). For example, in relation to the manufacturing industry particularly, processes are becoming increasingly digitized and the transition towards smart factories holds the promise to improve throughput and reduce any inefficiency significantly. Each day, machines, robots, programmable logic controllers (PLCs), and other sensing devices on a production line generate a large amount of data. The data may be stored locally or in a cloud environment. The data collected may be leveraged to help easily quantify, visualize, and tackle production losses or challenges. For example, bottlenecks which can change from time to time or shift to shift may be a major challenge for manufacturers, warehouses, distribution centers, supply chain participants, and transportation and/or logistics providers (e.g., via airplanes, ships, trains, trucks, etc.) to become more efficient and productive, especially small and mid-sized entities.

Many industrial manufacturers experience production bottlenecks (e.g., detected by failing to produce an expected number of products by the end of a day and/or shift). However, it is difficult to identify the bottleneck (which station or stations in a production line caused the most loss to throughput) and quantify losses unless it becomes very obvious. For example, a bottleneck may be detected when one machine/station breaks down for hours during the shift, but not if the machine is slightly less productive than expected. Due to the difficulty in identifying the bottleneck, the manufacturer may not be able to provide effective countermeasures to solve the bottleneck in a timely manner. Additional complexity in identifying a production (or a retrieval or a distribution) bottleneck is introduced by the dynamic nature of production bottlenecks that may change over time (e.g., between days or over the course of a day). The bottleneck machine/station today may not be an issue for tomorrow, and another machine/station will become the new bottleneck when the previous bottleneck is solved by itself or by production team when the team can identify it, for example, after a major machine downtime in a production line. For example, a bottleneck for an industrial manufacturer may be caused by unexpected machine downtime due to one or more of a set of critical alarms, a lack of operator support at a production station, a raw material imperfection and/or unavailability, or a process instability, among other issues that might affect production.

Some manufacturers extract machine historical data, such as uptime, downtime, and idle information from some of the machines or controllers in a production line. The manufacturers may get a sense of a particular machine's performance, for example overall uptime is 85% for that machine during a shift. Some machine vendors provide such statistic information through the Human-Machine Interface (HMI). But these data or information may not lead to an identification of production line bottleneck, which may require a wholistic view of all assets in the production line.

SUMMARY

Example implementations described herein involve an innovative method to enable manufacturers to become more efficient by providing a digital tool to track, visualize, quantify, and notify production bottlenecks for quick actions. While discussed below in relation to a production line, the method may be applied to many other industrial operations, such as warehouses, distribution centers, and logistics areas.

Aspects of the present disclosure include a method for analyzing time-stamp data collected associated with a plurality of elements of an industrial process; generating, based on the analyzed time-stamp data, a color coded visualization of the industrial process, wherein generating the color coded visualization comprises associating each of the plurality of elements of the industrial process with a corresponding color indicating a state of an element in the plurality of elements of the industrial process; and presenting, via a display, the generated color coded visualization of the industrial process.

Aspects of the present disclosure include a non-transitory computer readable medium, storing instructions for execution by a processor, which can involve instructions for analyzing time-stamp data collected associated with a plurality of elements of an industrial process; generating, based on the analyzed time-stamp data, a color coded visualization of the industrial process, wherein generating the color coded visualization comprises associating each of the plurality of elements of the industrial process with a corresponding color indicating a state of an element in the plurality of elements of the industrial process; and presenting, via a display, the generated color coded visualization of the industrial process.

Aspects of the present disclosure include a system, which can involve means for analyzing time-stamp data collected associated with a plurality of elements of an industrial process; generating, based on the analyzed time-stamp data, a color coded visualization of the industrial process, wherein generating the color coded visualization comprises associating each of the plurality of elements of the industrial process with a corresponding color indicating a state of an element in the plurality of elements of the industrial process; and presenting, via a display, the generated color coded visualization of the industrial process.

Aspects of the present disclosure include an apparatus, which can involve a processor, configured to analyze time-stamp data collected associated with a plurality of elements of an industrial process; generate, based on the analyzed time-stamp data, a color coded visualization of the industrial process, wherein generating the color coded visualization comprises associating each of the plurality of elements of the industrial process with a corresponding color indicating a state of an element in the plurality of elements of the industrial process; and present, via a display, the generated color coded visualization of the industrial process.

BRIEF DESCRIPTION OF DRAWINGS

FIG. 1 is a diagram illustrating a physical production line being modeled as a virtual production line in accordance with some aspects of the disclosure.

FIG. 7 illustrates a UI representing information for a first production line at different times in each of a set of diagrams in accordance with some aspects of the disclosure.

DETAILED DESCRIPTION

Figure 2:
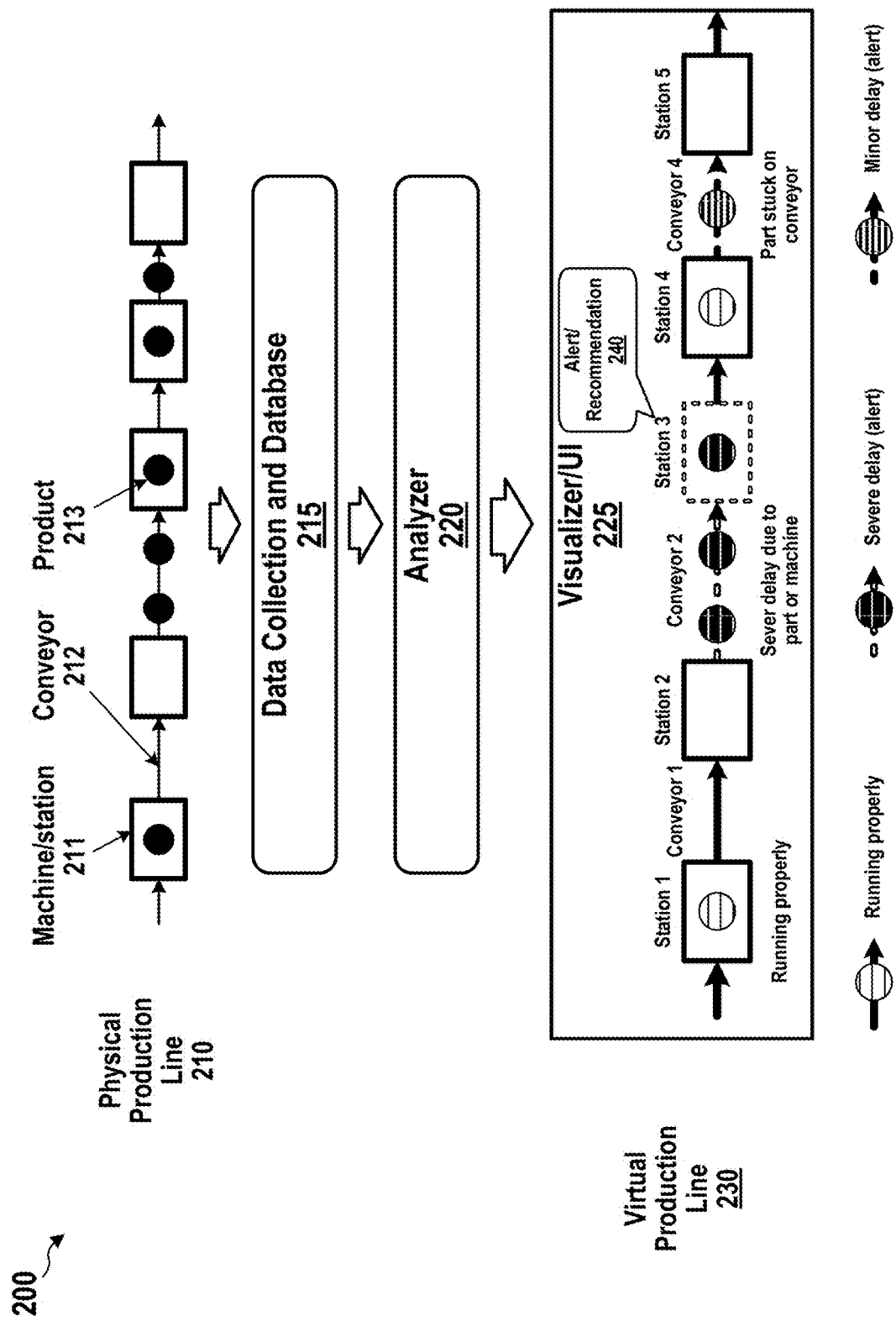
FIG. 2 is a diagram illustrating a set of operations for generating a virtual production line based on a physical production line in accordance with some aspects of the disclosure.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve an innovative method to enable manufacturers to become more efficient by providing a digital tool to track, visualize, quantify, and identify production status and bottlenecks for quick actions. While discussed below in relation to a production line, the method may be applied to many other industrial operations, such as warehouses, distribution centers, and logistics areas.

In some aspects, to address manufacturers' challenges relating to identifying, tracking or visualizing production line performance including bottlenecks, the method takes an actual production line (or warehouse or distribution center) layout and creates a digital twin model (e.g., via a software with user interface such as a web-based application). The digital twin model may then be color coded with different codes to represent the production traffic (e.g., traffic associated with conveyors between stations or other elements representing transitions in a warehouse or distribution model). The users may then use the color coded digital twin model to more easily identify the bottleneck visually (e.g., a transition that appears 'jammed' based on a color associated with slower-than-expected transitions). In some aspects, the method may use a reduced set of collected data that is often easier to collect, synchronize, and analyze for different applications. For example, the method, in some aspects, may use a set of data related to product ID, and a timestamp in and out of any production stations.

Additionally, in some aspects, the method may automatically quantify losses in real-time or near real-time at any portion of the production line (e.g., a machine/station or a conveyor) which may contribute to production throughput losses. The method, in some aspects, may also provide recommendations based on advanced data analytics and/or machine learning (ML) to assist a production team in improving operations. For example, the method may automatically change the route in highly connected production lines, forecast production volume, or predict a machine breakdown.

In addition to providing real-time production performance information with color coding to highlight production traffic/bottleneck. The method (or a UI associated with the method) may enable manufacturers (users) to select any historical date/data to see the production performance during the time selected. This function will allow users to easily identify production bottlenecks in the past, track whether bottlenecks have changed, or allocate resources to tackle production bottlenecks.

FIG. 1 is a diagram 100 illustrating a physical production line 110 being modeled as a virtual production line 120 in accordance with some aspects of the disclosure. While discussed in relation to a physical production line, the method may be applied to a warehouse or other industrial context in which time stamp data associated with different processes may be recorded. The physical production line may include, or be associated with, one or more conveyors 101 (or other transportation mechanism such an automated vehicle), stations 102, human workers 103, or robot arms 104. For example, in the physical production line 110, products (not illustrated) usually move from station to station with a robot or a human worker playing certain supporting roles at some stations. For other applications and/or environments, the conveyors 101 may be replaced by other means of transporting products or transitioning between stations, the stations 102 may represent different areas (e.g., a storage area, a packing area, a loading area, and so on as dictated by the system) in a warehouse or distribution center, and the human worker 103 may include human workers or human-controlled elements (e.g., forklifts, trucks, pallet jacks, hand trucks, and so on).

In some aspects, each machine may have a status indicator (machine running, idle, stopped, alarm). Based on the status indicator, a person on-site monitoring the different status indicators of the different machines may be able to get a general sense of the functioning of the physical production line 110. However, it is difficult and/or unlikely for the person to be able to identify the production bottleneck even with access to the machine status information. For example, if there are three machines generating an alarm and/or stopped at the same time for various minutes, it may be difficult for a person to determine how the different alarms or stoppages contribute to the bottleneck. In other words, all the machine stops need to be evaluated and compared holistically to determine the impact to throughput. On the other hand, the virtual production line 120 (e.g. the digital twin of the physical production line 110) may show the real-time performance of the physical production line 110 by highlighting the traffic (e.g., highlighted for the conveyor as illustrated, or for conveyors and machines). The virtual production line conveyor (e.g., conveyor 101), in some aspects, may be color coded to represent the production performance based on real-time traffic (e.g., a time parts spend between a first station and a next and/or adjacent station). The virtual production line 120 may be accessed through a user interface, for example a software and/or web-based application in a computer, tablet, or phone. Production team engineers and managers may more easily track line performance to identify and visually pinpoint a bottleneck and, based on a shared understanding about the production status, take actions collectively and effectively.

FIG. 2 is a diagram 200 illustrating a set of operations for generating a virtual production line 230 based on a physical production line 210 in accordance with some aspects of the disclosure. In some aspects, a physical production line 210 associated with a set of products 213 may include a set of machines and/or stations 211, a set of conveyors 212. Each machine and/or station 211 may produce data relating to each product 213 entering and/or exiting from the machine and/or station 211. The data may be provided to a data collection and database function 215. The data collection and/or database function 215 may collect the data from multiple machines and/or stations 211 regarding the status of the machine and/or station 211 as well as products 213 passing through the machine and/or station 211. The collected data may include a set of timestamps associated with each product entering and/or exiting the machine and/or station 211 along with an identifier of the product (e.g., a product ID) and other information used in the analysis and/or visualization.

An analyzer 220 may perform analysis of the collected (and stored) data to generated the visualization of the physical production line 210. The analyzer 220 may compute a time that products spend at the machine and/or station 211 or spent between stations. Based on the computed time, the analyzer 220 may assign different colors to different elements (e.g., a machine and/or station 211 or conveyor 212) of the physical production line 210. The different colors may then be displayed on the associated element of the virtual production line 230 in the visualizer/UI 225. The visualizer/UI 225, in some aspects, may further present an alert and/or recommendation 240 related to a particular element. The computed times and the associated colors may be presented to a user in real-time or near real-time or with a user-defined delay.

The visualizer/UI 225, in some aspects, may display and/or provide additional information to a user based on one or more other analyses performed by the analyzer 220, e.g., the visualizer/UI 225 may provide recommendations based on advanced data analytics utilizing historical as well as real-time data, or recommendations based on ML to assist a user (e.g., a production team) to improve operations. For example, the recommendations may relate to changing the route of some products in highly connected production lines with human operator support or automatically through feedback to a manufacturing execution system (IVIES), the standalone scheduling system, PLC, or other control devices. The analyzer 220, in some aspects, may generate and/or provide a forecast about one or more of a production volume or a predicted machine breakdown based on the real-time analytics performed by the analyzer 220. For example, the visualizer/UI 225 may indicate that a product, station, or conveyor is identified as being associated with running properly, a minor delay (such as a part being stuck on a conveyor), or a major delay (such as a machine and/or station experiencing downtime). The indication, in some aspects, may be based on one or more of a coloring of the elements or a displayed message indicating a source or description of the indicated status (e.g., station 3 experiencing downtime or part stuck on conveyer 4).

Figure 3:
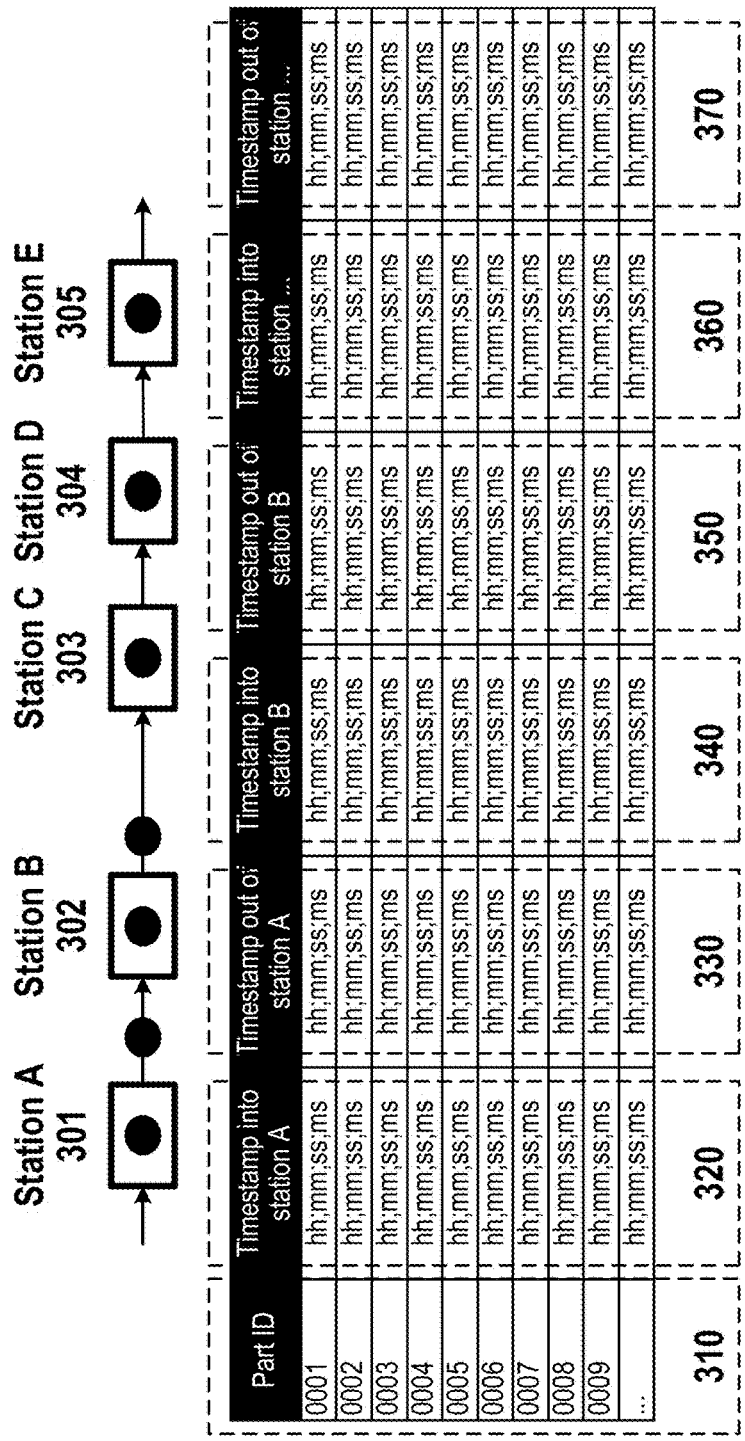
FIG. 3 is a diagram illustrating a minimal set of product data for analysis of a set of stations by an analyzer.

FIG. 3 is a diagram 300 illustrating a minimal set of product data for analysis of a set of stations 301, 302, 303, 304, and 305 by an analyzer (e.g., analyzer 220 of FIG. 2). The minimal set of product data, in some aspects, may include a product ID 310 (e.g., a serial number) and timestamps 320, 330, 340, 350, 360, and 370 associated with the product passing through each of the stations 301-305. Such data may be easy to collect for a modern production line via the machines and/or stations themselves or through PLC and/or common sensing devices, such as barcode scanner or radio frequency identification (RFID) (e.g., applied to pallets which sit on the conveyor and hold the products moving from station to station instead of having the product directly sit on the conveyor).

Figure 4:
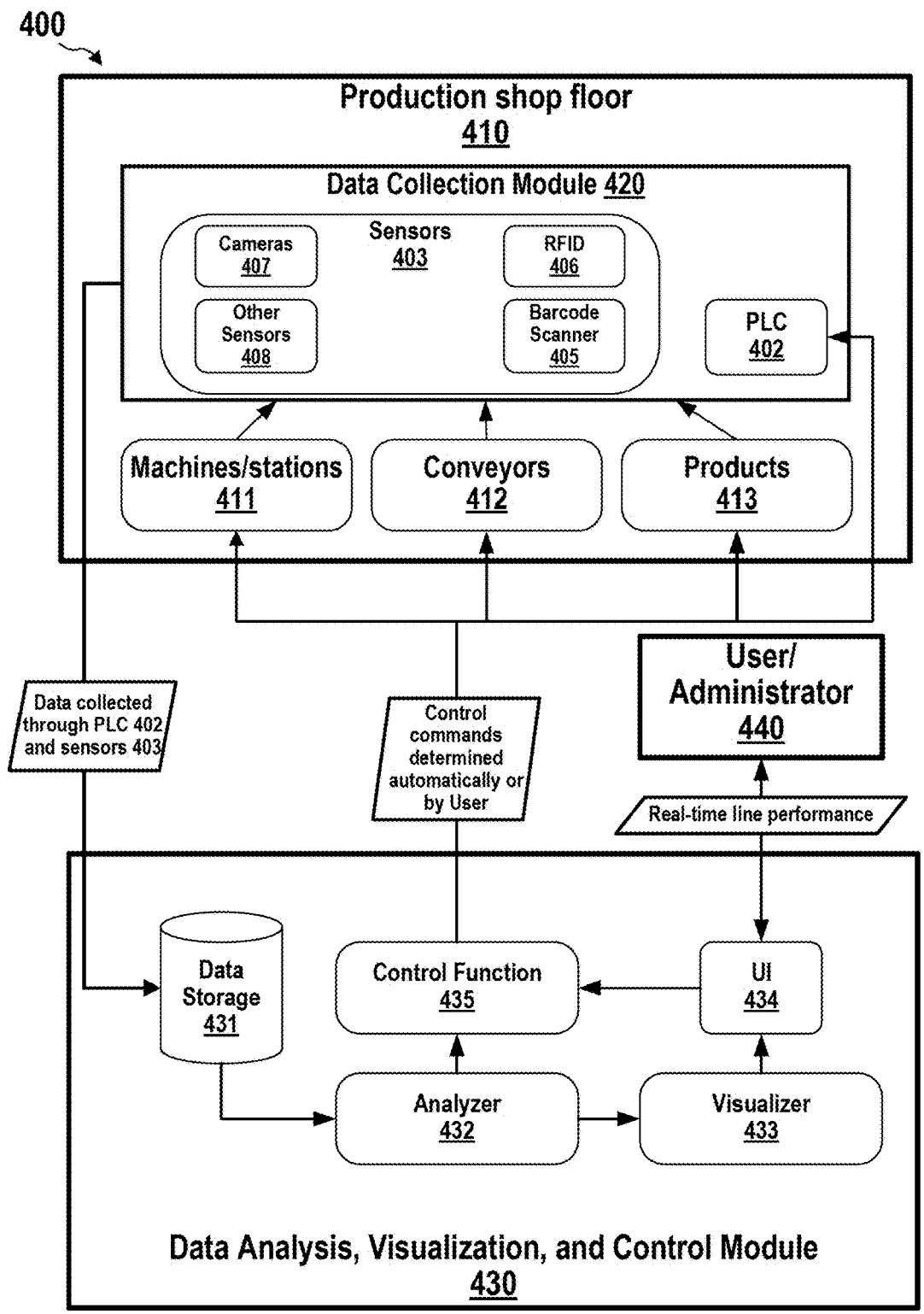
FIG. 4 is a diagram illustrating a set of interactions between components in a system to implement real-time production performance evaluation, bottleneck tracking, alerting, recommendation, and feedback in accordance with some aspects of the disclosure.

FIG. 4 is a diagram 400 illustrating a set of interactions between components in a system to implement real-time production performance evaluation, bottleneck tracking, alerting, recommendation, and feedback in accordance with some aspects of the disclosure. Once production starts, the individual parts (e.g., products 413) move from station to station (e.g., machines/stations 411) on a production shop floor 410 (e.g., an industrial production line, warehouse, or distribution center). A data collection module 420 may include a PLC 402 that may pull a product ID and timestamp information for each of the products 413 through one or more of sensors 403 (e.g., barcode scanner 405, RFID reader 406, cameras 407, or other sensors 408). The extracted data can be sent by the data collection module 420 to a database (e.g., data storage 431). The data storage 431, in some aspects may be a component of a data analysis, visualization, and control module 430. The extracted data may be accessed by an analyzer 432 of the data analysis, visualization, and control module 430. In some aspects, the collected data may be provided directly to the analyzer 432 or the data storage 431 may be included in the analyzer 432.

The analyzer 432 may perform a set of analysis tasks. For example, the analyzer 432 may compute time spent for products at each station or between stations and assigning a color to machines/stations 411, conveyors 412, or products 413 based on the data stored in data storage 431. The analyzer 432 may assign a color based on a comparison between the actual time spent by products 413 at machines/stations 411 with an ideal time based on initial production line design. In some aspects, if the actual time is the same as the ideal time (or within a range, such as ±10% around the ideal time), a green color may be assigned to products 413, conveyors 412, and/or machines/stations 411. If the actual time is more than the ideal time by a first threshold value (e.g., a first absolute value or a fractional value such as >10% of the ideal time), a second threshold value, or a third threshold value, a yellow, red, dark red color may be assigned, respectively, as illustrated in FIG. 1. While described above with reference to specific colors, other colors may be selected by a user/administrator 440. Additionally, a user/administrator 440 may set the thresholds (e.g., specific threshold time values and/or threshold fractional differences from an ideal time) and corresponding color designations.

The visualizer 433 may receive the results of the analysis performed by the analyzer 432 and generate a representation of the production shop floor 410 indicating the machines/stations 411, the conveyors 412, and the products 413. The representation of the production shop floor 410, in some aspects, may also indicate the assigned colors associated with the machines/stations 411, the conveyors 412, and the products 413 and display alerts and/or warnings. In some aspects, additional insights may be displayed, such as statistics regarding time spent by parts in a machine or on a conveyor between stations, bottleneck tracking, or alerts with recommendations to users when predicted production volume is below target. The representation of the production shop floor 410 (e.g., a real-time line performance) may be presented to a user/administrator 440 via the UI 434. The user/administrator 440 may provide feedback (e.g., a control command) in response to the information or an alert and/or warning displayed via the UI 434. In some aspects, the system (e.g., the analyzer 432 and the control function 435) may automatically generate control commands, e.g., based on rules configured by a user.

Figure 5:
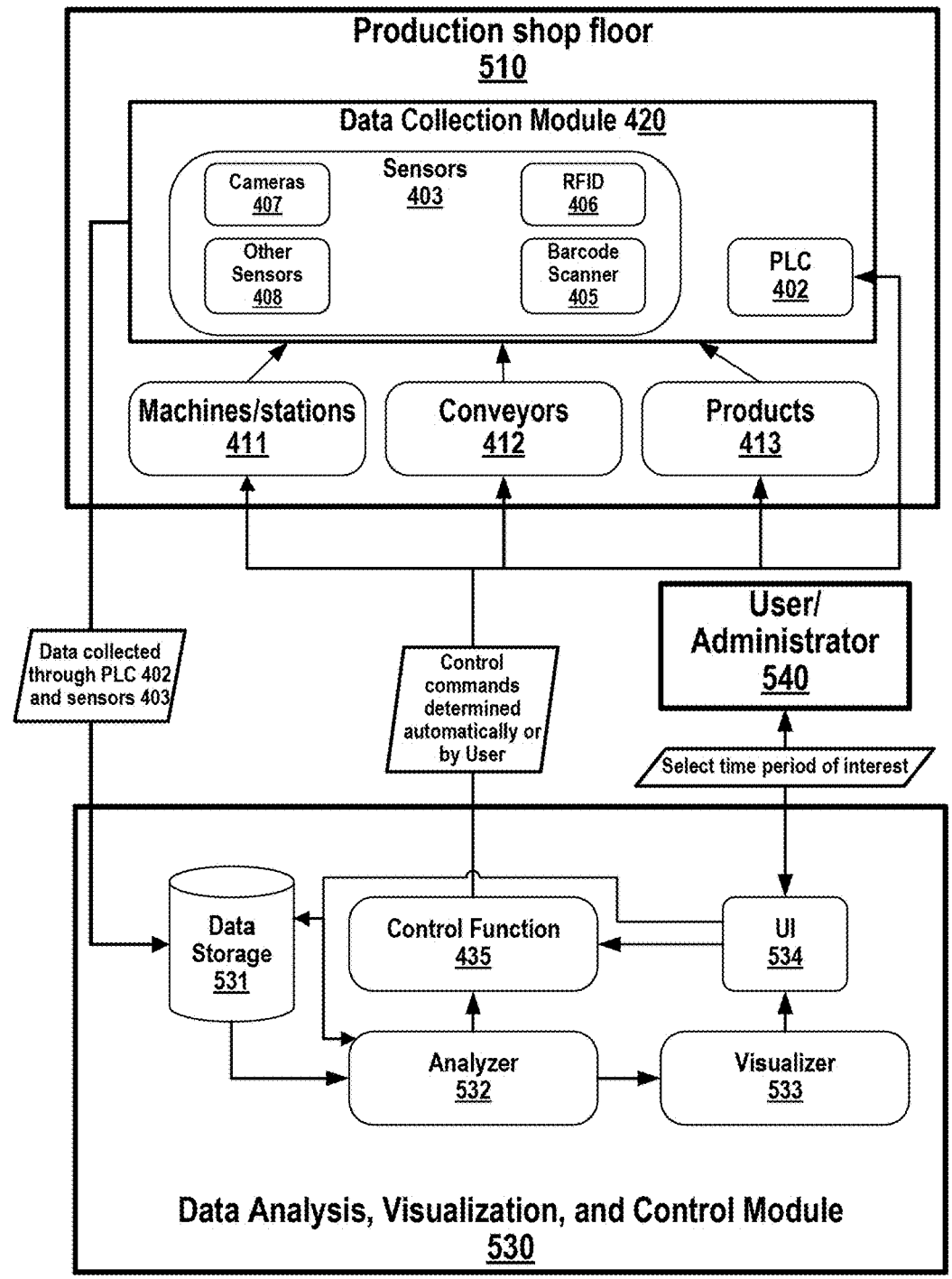
FIG. 5 is a diagram illustrating a set of interactions between components in a system to implement historic production performance evaluation, bottleneck tracking, alerting, recommendation, and feedback in accordance with some aspects of the disclosure.

FIG. 5 is a diagram 500 illustrating a set of interactions between components (e.g., a user/administrator 540 and a data analysis, visualization, and control module 530) in a system to implement historic production performance evaluation, bottleneck tracking, alerting, recommendation, and feedback in accordance with some aspects of the disclosure. Through the UI 534, the user/administrator 540 may select a time, for example a set of past hours, days, weeks or even months, and ask the analyzer 532 to obtain the data for the selected time from the data storage 531 and to perform analysis for the selected time. Based on the analysis by the analyzer 532, the visualizer 533 may replay the production status including the colors and alerts and/or warnings associated with the different elements of the production shop floor 510 (numbered as in FIG. 4 to indicate that they are equivalent elements). The analysis by the analyzer 532 and the visualizer 533 may also generate a report (and a display of the report) based on a configuration of the display (e.g., a configuration received from the user/administrator 540 or a default configuration) for presenting statistical information, such as overall production, average time spent by parts in a machine and/or station or on a conveyor between stations, a production volume (predicted vs. actual), machines and/or stations associated with a bottleneck, and how bottlenecks change over time, and so on.

Figure 6:
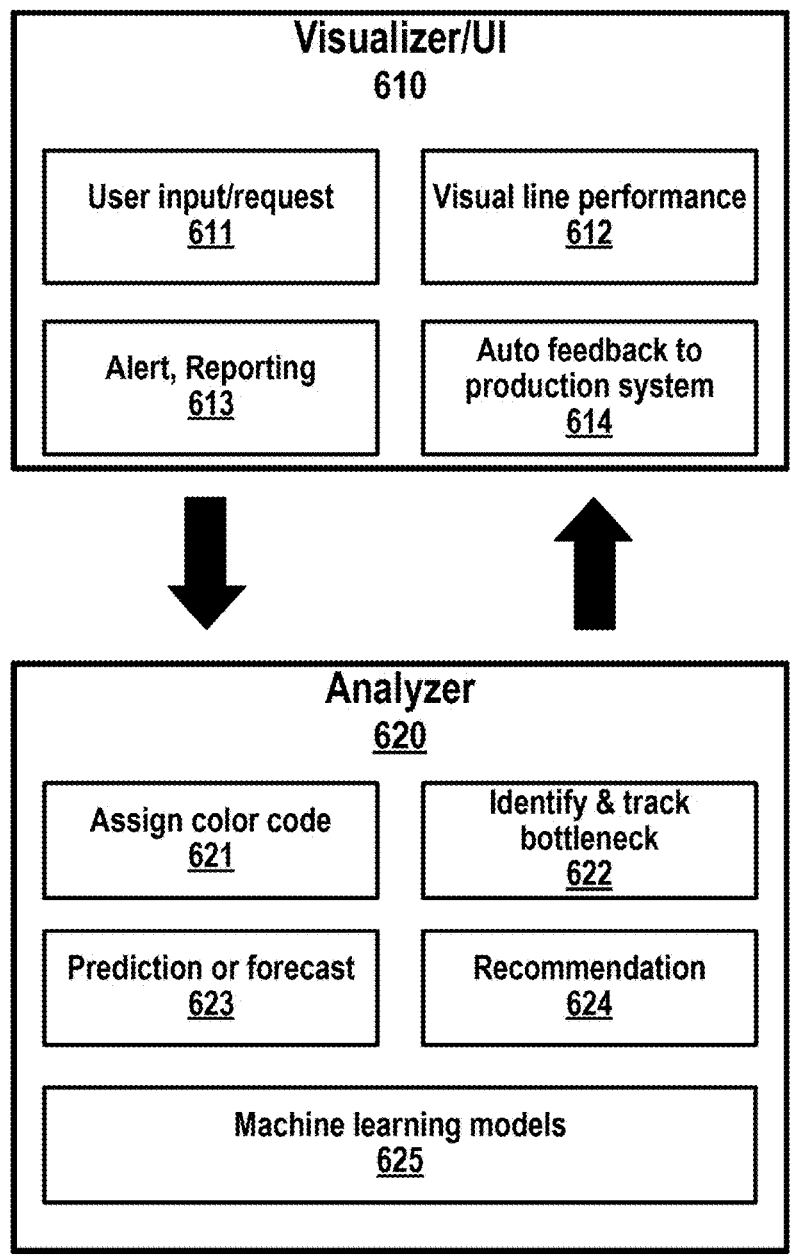
FIG. 6 is a diagram illustrating functions associated with an analyzer and a visualizer/UI in accordance with some aspects of the disclosure.

FIG. 6 is a diagram 600 illustrating functions associated with an analyzer 620 and a visualizer/UI 610 in accordance with some aspects of the disclosure. In some aspects, the Analyzer 620 may have a set of functions including a color code assignment function 621, a bottleneck identification and tracking function 622, a prediction and/or forecasting function 623, a recommendation function 624, and a set of machine learning trained models 625. The basic functions of the analyzer 620, in some aspects, include those functions described above such as computing time spent by parts in, or at, a machine and/or station or between stations; assigning a color code to a station, a machine, a conveyor and/or transition, and/or a product, as well as bottleneck tracking and highlighting.

As discussed above, in some aspects, the colors assigned by the color code assignment function 621 may be based on a set of colors selected by a user. In some aspects, the color assignment may be based on a set of values provided by the user. For example, a user may specify and/or provide a set of desired (ideal) times ($t_{ideal}$) for a product to be associated with each machine, station, or conveyor, and/or a total production time and a color associated with meeting the desired time along with conditions for displaying different colors based on a set of threshold values for the actual time of the product being associated with each machine, station, or conveyor, and/or a total production time. The different threshold values, in some aspects, may be specified as a fractional difference from the desired and/or ideal time provided for each station, machine, conveyor, and/or product (e.g., green≤1.05*$t_{ideal}$, 1.05*$t_{ideal}$<yellow≤1.15*$t_{ideal}$, 1.15*$t_{ideal}$<red≤1.5*$t_{ideal}$, 1.5*$t_{ideal}$<dark red). In some aspects, the user may specify the ideal times, a minimum time, a maximum time and two colors (e.g., white/black or green/red) from which to form a gradient (e.g., such that the colors can reflect finer gradations of differences from an ideal time than can be reflected by a small set of discrete ranges).

In addition, the analyzer 620, in some aspects, may perform more advanced analytics such as throughput prediction (via prediction and/or forecasting function 623), machine failure prediction (via prediction and/or forecasting function 623 and/or machine learning trained models 625). The analyzer 620, in some aspects, may generate recommendations (via prediction and/or forecasting function 623, recommendation function 624, and/or machine learning trained models 625) to a user (e.g., a production team) to take early actions to prevent unexpected production downtime. The prediction and/or forecasting function 623, recommendation function 624, and/or machine learning trained models 625, in some aspects may be based on product information previously collected and/or defined, e.g., historical production timestamp data. The prediction and/or forecasting function 623, recommendation function 624, and/or machine learning trained models 625, in some aspects, may be further enhanced by integrating machine alarms and other production inputs, such as maintenance records and other data collected by sensors associated with the system. However, even without the enhanced functionality, the system may solve the major challenges manufacturers face today in identifying production bottlenecks, quantifying losses, and taking prompt actions to address any production bottlenecks and improve line performance.

The visualizer/UI 610, in some aspects, may include a user input and/or request component 611, a visual line performance component 612, an alert and/or reporting component 613 and an automatic feedback component 614. The user input and/or request component 611 may receive configuration information, data requests, and or control commands from a user to have the visualizer provide information regarding components of a production line. The visualizer/UI 610 may pass along the user input (e.g., the configuration information or request) to the analyzer 620 to update the analysis based on the user input. The visualizer/UI 610 may then receive the updated analysis from the analyzer 620 and the visual line performance component 612 and alert and/or reporting component 613 may generate the visual representation of the production line along with the colors assigned by the color code assignment function 621 and any alerts and/or warnings identified by the analyzer 620 or the alert and/or warning component 613.

The automatic feedback component 614, in some aspects, may provide control commands to the production line automatically based on preconfigured rules or rules configured and/or specified by a user. The automatic feedback component 614 may generate an indication of the automatic feedback for the visualization/UI 610 to present to the user. The indication, in some aspects, may be an indication that a particular automatic response is suggested by the preconfigured and/or user-configured rules and that the action will be taken if the user approves or if the user fails to cancel within a specified time period. In some aspects, the automatic feedback component 614 may instead be included in the analyzer.

Figure 7:
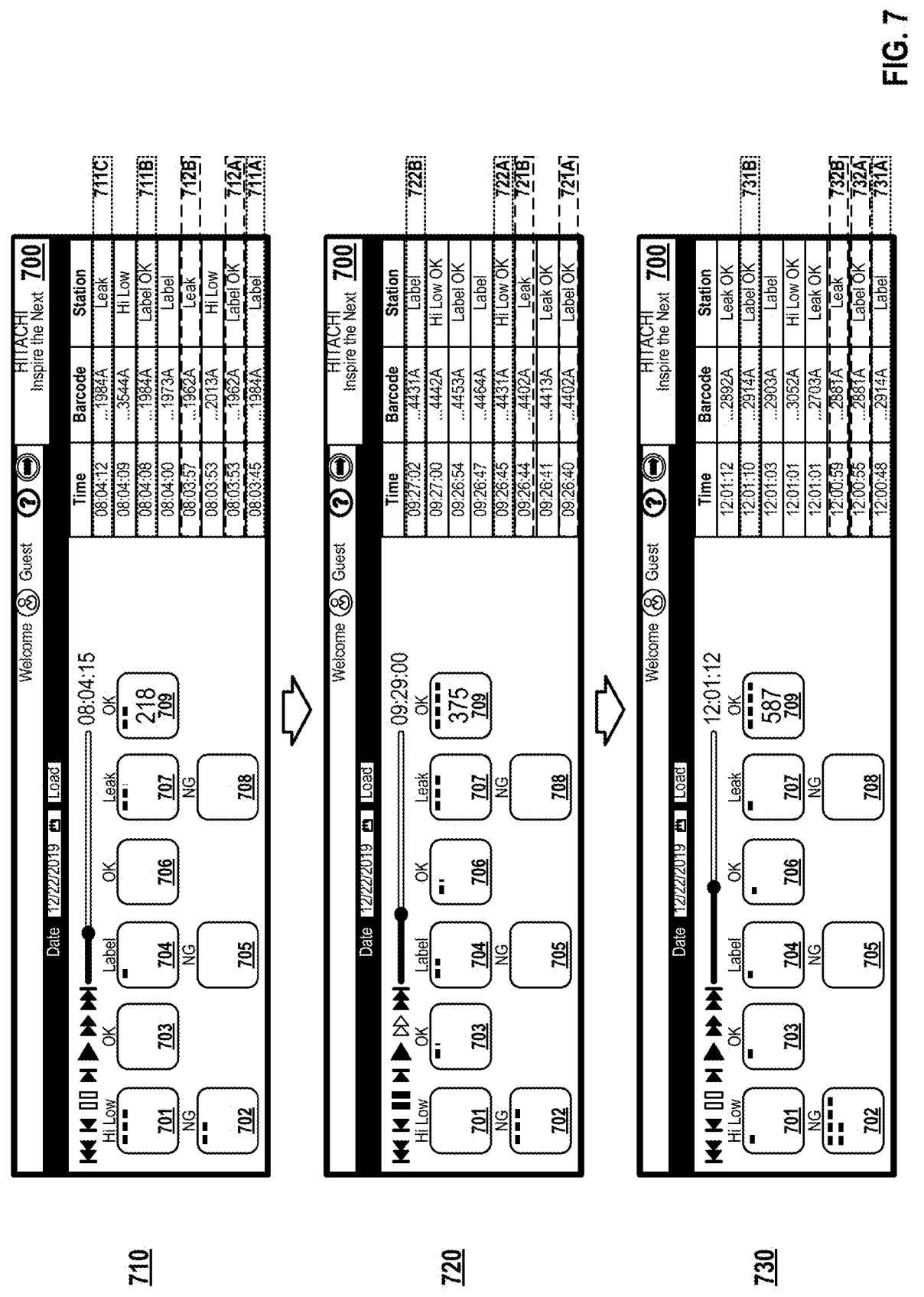

FIG. 7 illustrates a UI 700 representing information for a first production line at different times in each of diagrams 710, 720, and 730 in accordance with some aspects of the disclosure. The UI 700 illustrates a representation of a simplified production line including a set of three production stations and/or machines (e.g., a hi low station 701, a label station 704, and a leak test station 707). Each of the hi low station 701, the label station 704, and the leak test station 707, in some aspects, may be associated with a no good (NG) indicator 702, 705, and 708, respectively, that indicate parts and/or products that are identified as unsatisfactory in some way. In some aspects, each of the hi low station 701, the label station 704, and the leak test station 707, may be associated with an OK indicator 703, 706, and 709, respectively, that indicates that the product is good enough and may be passed to a next station. Each of the hi low station 701, the label station 704, and the leak test station 707; the NG indicators 702, 705, and 708; and the OK indicators 703, 706, and 709 may include an indication of a number of parts and/or products are currently at the station and/or machine, waiting to be further inspected, trashed or recycled, or in transit to a next station and/or machine, respectively. For a last OK indicator 709, an additional value "218" in diagram 710, "375" in diagram 720, or "587" in diagram 730 may be displayed indicating a number of parts produced. In some aspects, the display may also, or alternatively, include a predicted number of parts at a current pace and/or speed (and accuracy) of production.

The UI 700, in some aspects, may also display a set of recent events relating to the production line. For example, at the time associated with diagram 710, the UI 700 may display a set of events relating to a first part 711 entering the label station 704 at 711A, being identified as good enough to be processed ('Label OK") at 711B and entering the leak station 707 at 711C. Similarly, for a second part 712, the set of events may include being identified as good enough to be processed ('label OK") at 712A and entering the leak station 707 at 712B. Events (e.g., events 721A, 721B, 722A, 722B, 731A, 731B, 732A, and 732B) for other parts (721, 722, 731, and 732) may be displayed by the UI 700 as in diagrams 720 and 730. From the times displayed, a user can identify a time spent at each station for each product and/or part (e.g., 711, 712, 721, 722, 731, and/or 732).

Figure 8:
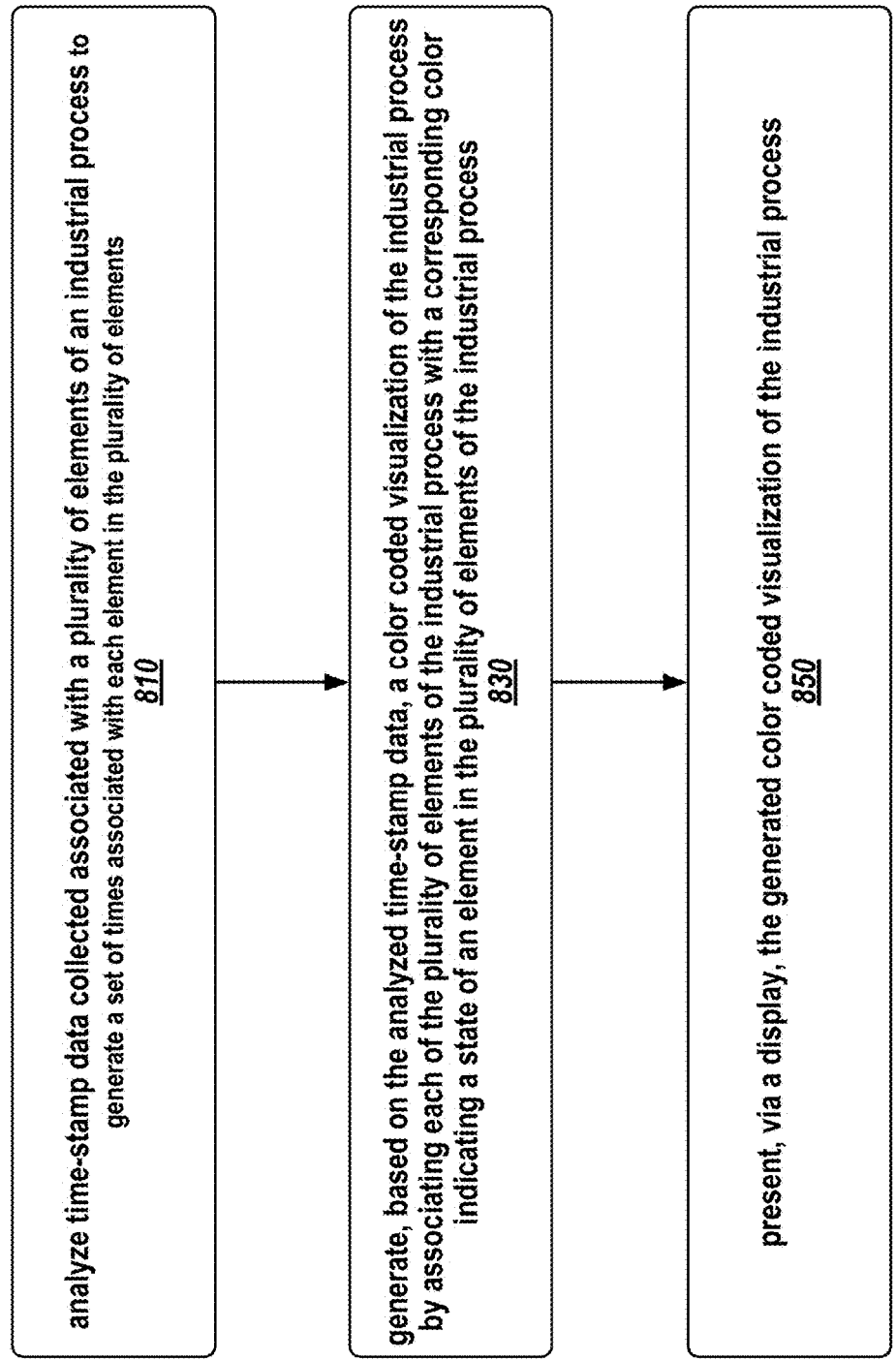
FIG. 8 is a flow figure illustrating a method in accordance with some aspects of the disclosure.

FIG. 8 is a flow diagram 800 illustrating a method in accordance with some aspects of the disclosure. In some aspects, the method is performed by an analysis apparatus (e.g., an analyzer 220/432/532/620, a data analysis, visualization, and control module 430/530), a visualizer/UI apparatus (e.g., visualizer/UI 225/610, a visualizer 433/533, and/or a UI 434/534), and/or computing device 1005) that performs various analyses and present the results of the analyses based on collected data. At 810, the apparatus may analyze time-stamp data collected associated with a plurality of elements of an industrial process to generate a set of times associated with each element in the plurality of elements. For example, 810 may be performed by an analyzer 220/432/532/620, a data analysis, visualization, and control module 430/530 of FIGS. 2 and 4-6 or processors 1010 of computing device 1005 of FIG. 10. In some aspects, the industrial process is a production line and the plurality of elements of the industrial process includes one or more of production stations (e.g., machines and/or stations) in the production line and a set of transitions between the production stations. The set of times associated with each element in the plurality of elements, in some aspects, relates to a time duration associated with a product passing through the element and the state of each element relates to the set of times associated with the element. Each element in the plurality of elements, in some aspects, may be associated with a corresponding characteristic time. For example, referring to FIGS. 2-6, the analyzer 220/432/532/620 may analyze time stamp data (a product ID 310 and timestamps 320-370) collected from a physical production line 210.

In some aspects, the time-stamp data may include data related to each element of the industrial process for a set of products associated with the production line. The time-stamp data related to each element of the industrial process, in some aspects, may include a first time-stamp indicating a first time at which the element becomes associated with each product in the set of products and a second time-stamp indicating a second time at which the product is transferred to a next element and the set of times associated with each element in the plurality of elements is a set of times that a corresponding set of products is associated with the element in the plurality of elements. The time-stamp data, in some aspects, further includes one or more of machine alarm information, operational characteristics associated with one or more elements in the plurality of elements, information regarding an environment of the industrial process, or information regarding an output of the industrial process.

The apparatus may generate, based on the analyzed time-stamp data, a prediction as to one of a production rate or a production target of the industrial process. The prediction, in some aspects, may be based on historical data as well as current data. The prediction, in some aspects, may trigger a warning and/or an alert when a predicted production is below a threshold value. For example, referring to FIGS. 2 and 4-6, the analyzer 220/432/532/620 (e.g., the prediction and/or forecasting function 623 or the machine learning trained model 625 of analyzer 620) may analyze the time-stamp data (current and historical) to predict a production rate or a production target.

At 830 the apparatus may generate a color coded visualization of the industrial process based on the analyzed (at 810) time-stamp data. For example, 830 may be performed by an analyzer 220/432/532/620, a visualizer 433/533, a visualizer/UI 610, and/or a data analysis, visualization, and control module 430/530 of FIGS. 2 and 4-6 or processors 1010 of computing device 1005 of FIG. 10. In some aspects, generating the color coded visualization at 830 includes associating each of the plurality of elements of the industrial process with a corresponding color indicating a state of an element in the plurality of elements of the industrial process. The corresponding color indicating the state of the element of the industrial process, in some aspects, is based on the corresponding characteristic time (e.g., $t_{ideal}$) as described above. In some aspects, a set of threshold times associated with a corresponding set of colors for indicating the state of each element in the plurality of elements may be defined. The set of threshold times for each element, in some aspects, may be based on the corresponding characteristic time for the element. In some aspects, each threshold time in the set of threshold times for a particular element is the corresponding characteristic time plus an offset time that is based on a factor multiplied by the corresponding characteristic time (e.g., the set of threshold values may be defined as $t_{ideal}+0.05*t_{ideal}$, $t_{ideal}+0.15*t_{ideal}$, and $t_{ideal}+0.50*t_{ideal}$). The corresponding color indicating the state of the element, in some aspects, may be selected from a color gradient and times associated with endpoints of the color gradient are based on the corresponding characteristic time. For example, referring to FIGS. 2 and 4-6, the analyzer 220/432/532/620 (e.g., color code assignment function 621) may analyze the time-stamp data (current and historical) to assign colors to different elements of the production line (e.g., an industrial process) and a visualizer 225/433/533 and/or UI 434/534 or visualizer/UI 610 may generate the color coded visualization of the industrial process based on the assigned colors.

In some aspects, the generated color coded visualization of the industrial process includes a simplified block model of the plurality of elements of the industrial process, where each block in the simplified block model represents an element in the plurality of elements and is associated with the corresponding color. The generated color coded visualization of the industrial process includes, in some aspects, includes a digital twin model of the plurality of elements of the industrial process with each element in the plurality of elements being overlaid with the corresponding color indicating the state of the element of the industrial process. For example, referring to FIGS. 1, 2, and 7, the generated color coded visualization of the industrial process may include a simplified model such as virtual production line 230, or the set of blocks 701-709 as included in UI 700 of FIG. 7, or a virtual production line 120.

The apparatus may identify one or more of a set of one or more bottlenecks associated with the industrial process, a set of warnings, or a set of recommendations for presentation to a process administrator of the industrial process based on the analyzed time-stamp data. The set of bottlenecks may include elements of the industrial process (e.g., machines and/or stations) that are associated with time spent for each product that is above a threshold time. The threshold time may be based on a desired time (e.g., $t_{ideal}$) as well as a relative congestion compared to other elements. For example, a bottleneck may be identified as an element that is at least 20% (or some other configured value) more congested than an average congestion of the elements or of a least congested element. The warnings may be based on alerts from the elements or based on the analysis at 810 of the time-stamp data. For example, referring to FIGS. 2 and 4-6, the analyzer 220/432/532/620 (e.g., bottleneck identification and tracking function 622 or recommendation function 624) may analyze the time-stamp data (current and historical) to identify one or more bottlenecks associated with the production line (e.g., industrial process), a set of warnings, or a set of recommendations, and a visualizer 225/433/533 and/or UI 434/534 or visualizer/UI 610 may generate an indication of the identified bottlenecks, warnings, or recommendations for presentation to a user via UI 434/534 or visualizer/UI 610.

At 850, the apparatus may present, via a display, the generated color coded visualization of the industrial process. For example, 850 may be performed by a visualizer 225/433/533, a UI 434/534, a visualizer/UI 610, and/or a data analysis, visualization, and control module 430/530 of FIGS. 2 and 4-6 or I/O interface 1025, output device/interface 1040, processors 1010 of computing device 1005 of FIG. 10. In some aspects, the apparatus may also present, along with the generated color coded visualization of the industrial process, the one or more of the set of one or more bottlenecks associated with the industrial process, the set of warnings, or the set of recommendations for presentation to the process administrator of the industrial process. For example, referring to FIGS. 1, 2, and 4-7, the visualizer 225/433/533, UI 434/534, and/or visualizer/UI 610 may generate a UI 700 and/or a display of a virtual production line 120/230 including the color code and, in some aspects, an alert and/or recommendation 240, an indication of the identified bottlenecks, warnings, or recommendations for presentation to a user via UI 434/534 or visualizer/UI 610. In some aspects, the one or more of the set of one or more bottlenecks associated with the industrial process, the set of warnings, or the set of recommendations is associated with at least one automated response and the apparatus may output a command to at least one element of the plurality of elements of the industrial process to implement the automated response. For example, the at least one automated response may be an automated response based on a set of rules preconfigured for the system and/or configured by a user.

Figure 9:
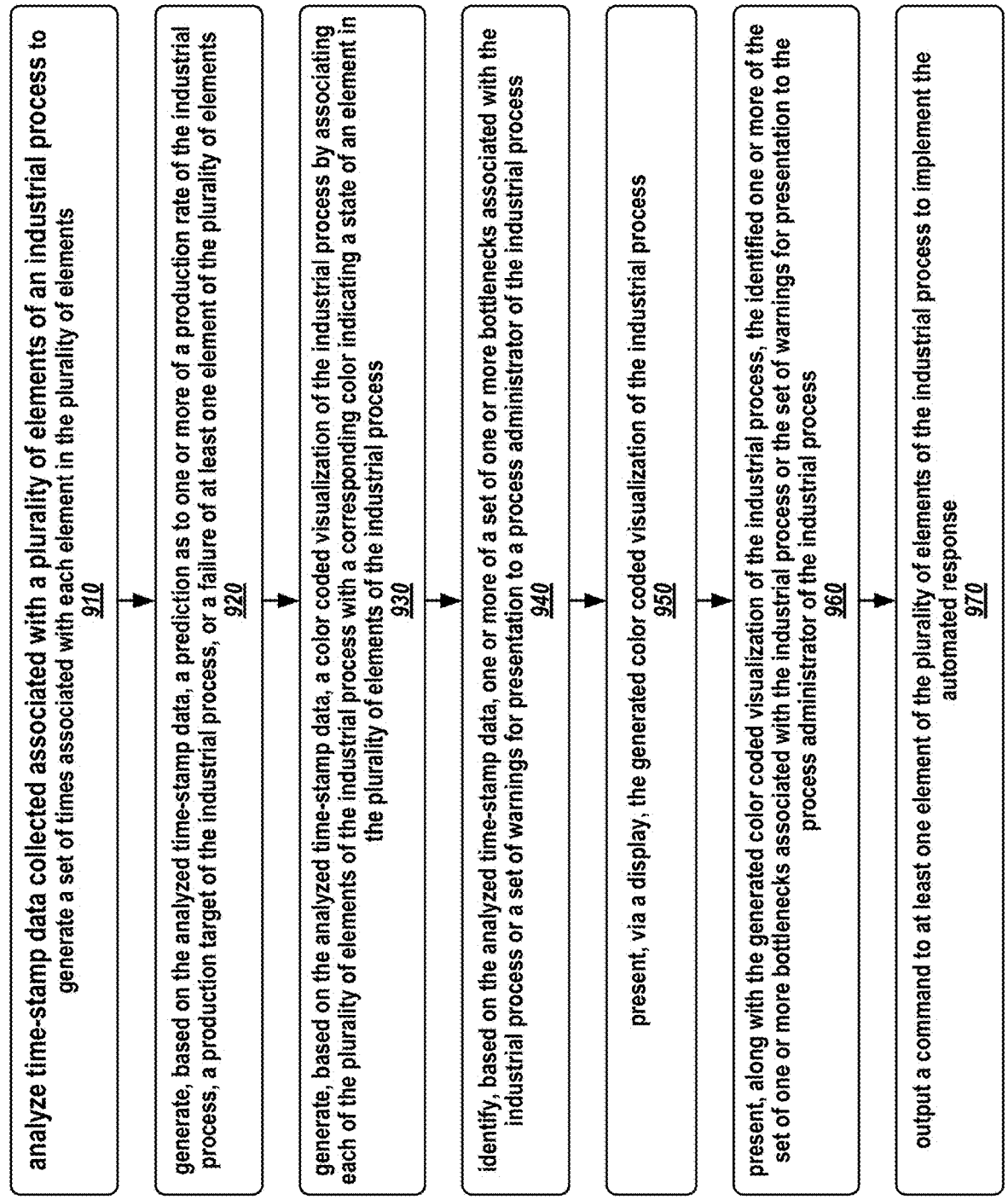
FIG. 9 is a flow figure illustrating a method in accordance with some aspects of the disclosure.

FIG. 9 is a flow diagram 900 illustrating a method in accordance with some aspects of the disclosure. In some aspects, the method is performed by an analysis apparatus (e.g., an analyzer 220/432/532/620, a data analysis, visualization, and control module 430/530), a visualizer/UI apparatus (e.g., visualizer/UI 225/610, a visualizer 433/533, and/or a UI 434/534), and/or computing device 1005) that performs various analyses and present the results of the analyses based on collected data. At 910, the apparatus may analyze time-stamp data collected associated with a plurality of elements of an industrial process to generate a set of times associated with each element in the plurality of elements. For example, 910 may be performed by an analyzer 220/432/532/620, a data analysis, visualization, and control module 430/530 of FIGS. 2 and 4-6 or processors 1010 of computing device 1005 of FIG. 10. In some aspects, the industrial process is a production line and the plurality of elements of the industrial process includes one or more of production stations (e.g., machines and/or stations) in the production line and a set of transitions between the production stations. The set of times associated with each element in the plurality of elements, in some aspects, relates to a time duration associated with a product passing through the element and the state of each element relates to the set of times associated with the element. Each element in the plurality of elements, in some aspects, may be associated with a corresponding characteristic time. For example, referring to FIGS. 2-6, the analyzer 220/432/532/620 may analyze time stamp data (a product ID 310 and timestamps 320-370) collected from a physical production line 210.

In some aspects, the time-stamp data may include data related to each element of the industrial process for a set of products associated with the production line. The time-stamp data related to each element of the industrial process, in some aspects, may include a first time-stamp indicating a first time at which the element becomes associated with each product in the set of products and a second time-stamp indicating a second time at which the product is transferred to a next element and the set of times associated with each element in the plurality of elements is a set of times that a corresponding set of products is associated with the element in the plurality of elements. The time-stamp data, in some aspects, further includes one or more of machine alarm information, operational characteristics associated with one or more elements in the plurality of elements, information regarding an environment of the industrial process, or information regarding an output of the industrial process.

At 920, the apparatus may generate, based on the analyzed time-stamp data, a prediction as to one or more of a production rate of the industrial process, a production target of the industrial process, or a failure of at least one element of the plurality of elements. For example, 920 may be performed by an analyzer 220/432/532/620, a prediction and/or forecasting function 623, a machine learning trained model 625, and/or a data analysis, visualization, and control module 430/530 of FIGS. 2 and 4-6 or processors 1010 of computing device 1005 of FIG. 10. The prediction, in some aspects, may be based on historical data as well as current data. The prediction, in some aspects, may trigger a warning and/or an alert when a predicted production is below a threshold value or when an element is predicted to fail within a configured time period. For example, referring to FIGS. 2 and 4-6, the analyzer 220/432/532/620 (e.g., the prediction and/or forecasting function 623 or the machine learning trained model 625 of analyzer 620) may analyze the time-stamp data (current and historical) to predict a production rate, a production target, or a failure of a station and/or machine, a conveyor, or a robotic component of the production line (or distribution center).

At 930 the apparatus may generate a color coded visualization of the industrial process based on the analyzed (at 910) time-stamp data. For example, 930 may be performed by an analyzer 220/432/532/620, a visualizer 433/533, a visualizer/UI 610, and/or a data analysis, visualization, and control module 430/530 of FIGS. 2 and 4-6 or processors 1010 of computing device 1005 of FIG. 10. In some aspects, generating the color coded visualization at 930 includes associating each of the plurality of elements of the industrial process with a corresponding color indicating a state of an element in the plurality of elements of the industrial process. The corresponding color indicating the state of the element of the industrial process, in some aspects, is based on the corresponding characteristic time (e.g., as described above. In some aspects, a set of threshold times associated with a corresponding set of colors for indicating the state of each element in the plurality of elements may be defined. The set of threshold times for each element, in some aspects, may be based on the corresponding characteristic time for the element. In some aspects, each threshold time in the set of threshold times for a particular element is the corresponding characteristic time plus an offset time that is based on a factor multiplied by the corresponding characteristic time (e.g., the set of threshold values may be defined as $t_{ideal}+0.05*t_{ideal}$, $t_{ideal}+0.15*t_{ideal}$, and $t_{ideal}+0.50*t_{ideal}$). The corresponding color indicating the state of the element, in some aspects, may be selected from a color gradient and times associated with endpoints of the color gradient are based on the corresponding characteristic time. For example, referring to FIGS. 2 and 4-6, the analyzer 220/432/532/620 (e.g., color code assignment function 621) may analyze the time-stamp data (current and historical) to assign colors to different elements of the production line (e.g., an industrial process) and a visualizer 225/433/533 and/or UI 434/534 or visualizer/UI 610 may generate the color coded visualization of the industrial process based on the assigned colors.

In some aspects, the generated color coded visualization of the industrial process includes a simplified block model of the plurality of elements of the industrial process, where each block in the simplified block model represents an element in the plurality of elements and is associated with the corresponding color. The generated color coded visualization of the industrial process includes, in some aspects, includes a digital twin model of the plurality of elements of the industrial process with each element in the plurality of elements being overlaid with the corresponding color indicating the state of the element of the industrial process. For example, referring to FIGS. 1, 2, and 7, the generated color coded visualization of the industrial process may include a simplified model such as virtual production line 230, or the set of blocks 701-709 as included in UI 700 of FIG. 7, or a virtual production line 120.

At 940, the apparatus may identify one or more of a set of one or more bottlenecks associated with the industrial process, a set of warnings, or a set of recommendations for presentation to a process administrator of the industrial process based on the analyzed time-stamp data. For example, 940 may be performed by an analyzer 220/432/532/620, and/or a data analysis, visualization, and control module 430/530 of FIGS. 2 and 4-6 or processors 1010 of computing device 1005 of FIG. 10. The set of bottlenecks may include elements of the industrial process (e.g., machines and/or stations) that are associated with time spent for each product that is above a threshold time. The threshold time may be based on a desired time (e.g., t) as well as a relative congestion compared to other elements. For example, a bottleneck may be identified as an element that is at least 20% (or some other configured value) more congested than an average congestion of the elements or of a least congested element. The warnings may be based on alerts from the elements or based on the analysis at 910 of the time-stamp data. For example, referring to FIGS. 2 and 4-6, the analyzer 220/432/532/620 (e.g., bottleneck identification and tracking function 622 or recommendation function 624) may analyze the time-stamp data (current and historical) to identify one or more bottlenecks associated with the production line (e.g., industrial process), a set of warnings, or a set of recommendations, and a visualizer 225/433/533 and/or UI 434/534 or visualizer/UI 610 may generate an indication of the identified bottlenecks, warnings, or recommendations for presentation to a user via UI 434/534 or visualizer/UI 610.

At 950, the apparatus may present, via a display, the generated color coded visualization of the industrial process. For example, 950 may be performed by a visualizer 225/433/533, a UI 434/534, a visualizer/UI 610, and/or a data analysis, visualization, and control module 430/530 of FIGS. 2 and 4-6 or I/O interface 1025, output device/interface 1040, processors 1010 of computing device 1005 of FIG. 10. In some aspects, the apparatus may also, at 960, present, along with the generated color coded visualization of the industrial process, the one or more of the set of one or more bottlenecks associated with the industrial process, the set of warnings, or the set of recommendations identified at 940 for presentation to the process administrator of the industrial process. For example, referring to FIGS. 1, 2, and 4-7, the visualizer 225/433/533, UI 434/534, and/or visualizer/UI 610 may generate a UI 700 and/or a display of a virtual production line 120/230 including the color code and, in some aspects, an alert and/or recommendation 240, an indication of the identified bottlenecks, warnings, or recommendations for presentation to a user via UI 434/534 or visualizer/UI 610.

In some aspects, the one or more of the set of one or more bottlenecks associated with the industrial process, the set of warnings, or the set of recommendations is associated with at least one automated response and, at 970, the apparatus may output a command to at least one element of the plurality of elements of the industrial process to implement the automated response. For example, 970 may be performed by a visualizer/UI 610 (e.g., the automatic feedback component 614), and/or a data analysis, visualization, and control module 430/530 of FIG. 4-6 or I/O interface 1025 and/or processors 1010 of computing device 1005 of FIG. 10. For example, the at least one automated response may be an automated response based on a set of rules preconfigured for the system and/or configured by a user.

The solution disclosed can solve a major challenge industry facing today about identifying operation bottleneck, quantifying losses and taking prompt actions to address bottleneck and improve operation throughput or efficiency. Our solution is not limited for manufacturing industry production line operations. And can be applied to warehouse, distribution center, transportation and logistics area as well. The prior art may help manufacturer improve a production line design by identifying any inefficiency related to motion of industry equipment, but not able to address the bottleneck triggered by unexpected downtime, due to machine failure, raw material issue, human operator error or an instable manufacturing process. With this solution, we provide customer a digital tool, which automatically analyzing customers' line performance, identifying bottlenecks, quantifying losses and presenting the findings and insights in innovative way through a UI so customers can quickly take actions to improve performance. With our solution, customer will be able to maintain high throughput and efficiency, lower cost and waste and sustain operations with great competitiveness.

As discussed above, example implementations described herein involve an innovative method to enable managers of a production line, warehouse, or distribution center to more quickly identify and solve (or pre-empt) problems by providing a digital tool to predict, track, visualize, quantify, and identify production bottlenecks for quick actions by a user or based on a set of automated responses to common problems. The components of the system such as the data collection module 420/530 and the analyzer 220/620 or the data analysis, visualization, and control module 430/530 interact in novel ways to provide information to a user to enable quick identification of problems and the ability to quickly act to solve problems as they are identified. While discussed above in relation to a production line, the method may be applied to many other industrial operations, such as warehouses, distribution centers, supply chain and logistics areas.

In some aspects, to address manufacturers' challenges relating to identifying, tracking or visualizing production line performance including bottlenecks, the method takes an actual production line (or warehouse or distribution center) layout and creates a digital twin model (e.g., via a software with user interface such as a web-based application). The digital twin model may then be color coded (e.g., conveyors between stations or other elements representing transitions in a warehouse or distribution model) with different codes to represent the production traffic. The users may then use the color coded digital twin model to more easily identify the bottleneck visually (e.g., a transition that appears 'jammed' based on a color associated with slower-than-expected transitions). In some aspects, the method may use a reduced set of collected data that is often easier to collect, synchronize, and analyze for different applications. For example, the method, in some aspects, may use a set of data related to product ID, and a timestamp in and out of any production stations.

Additionally, in some aspects, the method may automatically quantify losses in real-time or near real-time at any portion of the production line (e.g., a machine/station or a conveyor) which may contribute to production throughput losses. The method, in some aspects, may also provide recommendations based on advanced data analytics and/or ML to assist a production team in improving operations. For example, the method may automatically change the route in highly connected production lines, forecast production volume, or predict a machine breakdown.

In addition to providing real-time production performance information with color coding to highlight production traffic/bottleneck. The method (or a UI associated with the method) may enable manufacturers (users) to select any historical date/data to see the production performance during the time selected. This function will allow users to easily identify production bottlenecks in the past, track whether bottlenecks have changed, or allocate resources to tackle production bottlenecks.

Accordingly, the application of the method above may allow managers of production lines, warehouses, distribution centers, supply chain or logistics to identify operation bottleneck and inefficiency easily, and implement countermeasures accordingly.

Figure 10:
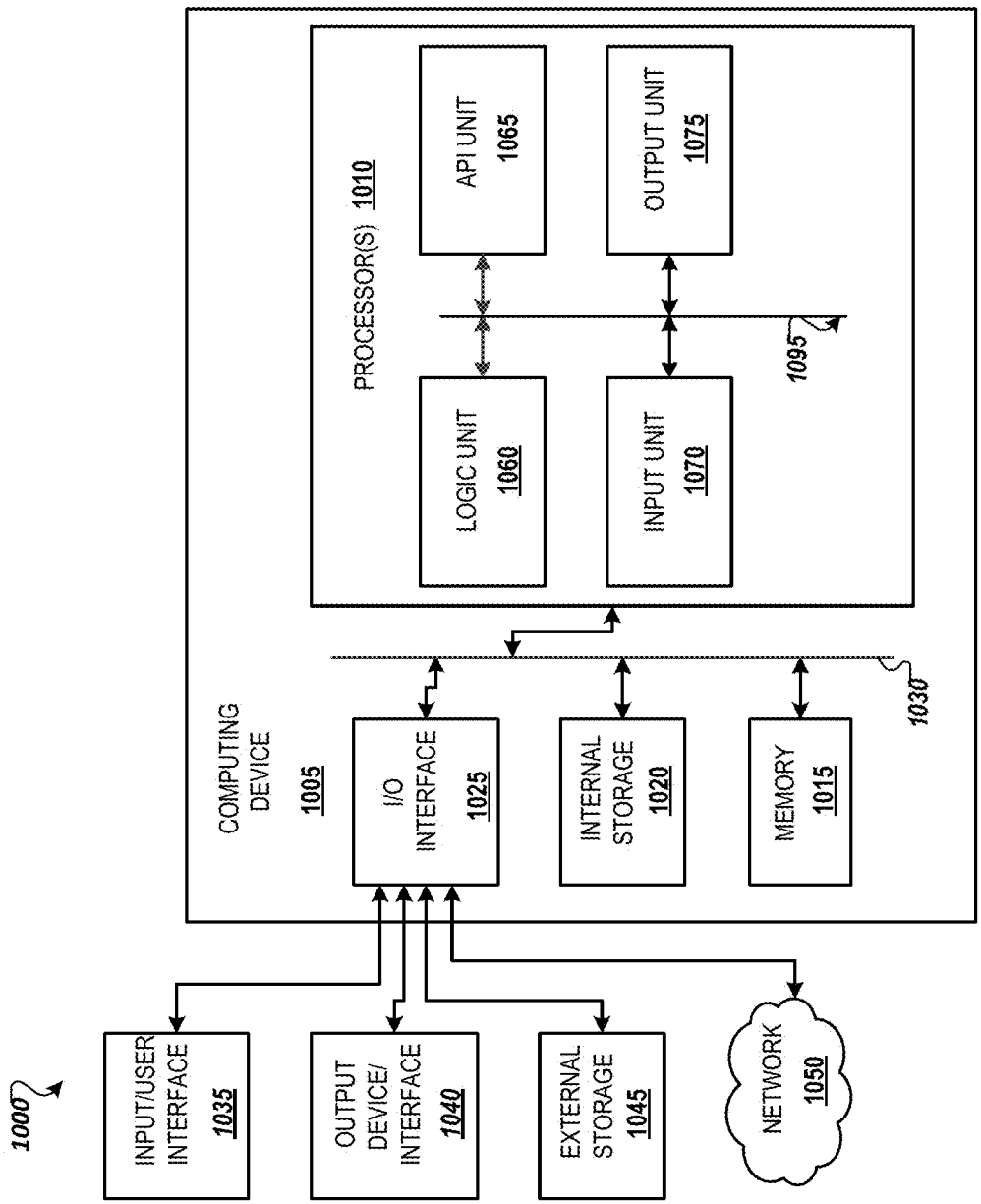
FIG. 10 illustrates an example computing environment with an example computer device suitable for use in some example implementations.

FIG. 10 illustrates an example computing environment with an example computer device suitable for use in some example implementations. Computer device 1005 in computing environment 1000 can include one or more processing units, cores, or processors 1010, memory 1015 (e.g., RAM, ROM, and/or the like), internal storage 1020 (e.g., magnetic, optical, solid-state storage, and/or organic), and/or IO interface 1025, any of which can be coupled on a communication mechanism or bus 1030 for communicating information or embedded in the computer device 1005. IO interface 1025 is also configured to receive images from cameras or provide images to projectors or displays, depending on the desired implementation.

Computer device 1005 can be communicatively coupled to input/user interface 1035 and output device/interface 1040. Either one or both of the input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via IO interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

IO interface 1025 can include but is not limited to, wired and/or wireless interfaces using any communication or IO protocols or standards (e.g., Ethernet, 1002.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computer device 1005 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, the input unit 1070, the output unit 1075, in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide an output based on the calculations described in example implementations.

Processor(s) 1010 can be configured to analyze time-stamp data collected associated with a plurality of elements of an industrial process. The processor(s) 1010 can be configured to generate, based on the analyzed time-stamp data, a color coded visualization of the industrial process, where generating the color coded visualization comprises associating each of the plurality of elements of the industrial process with a corresponding color indicating a state of an element in the plurality of elements of the industrial process. The processor(s) 1010 can be configured to present, via a display, the generated color coded visualization of the industrial process.

The processor(s) 1010 can also be configured generate, based on the analyzed time-stamp data, a prediction as to one of a production rate or a production target of the industrial process. The processor(s) 1010 can also be configured to identify, based on the analyzed time-stamp data, one or more of a set of one or more bottlenecks associated with the industrial process, a set of warnings, or a set of recommendations for presentation to a process administrator of the industrial process. The processor(s) 1010 can also be configured to present, along with the generated color coded visualization of the industrial process, the identified one or more of the set of one or more bottlenecks associated with the industrial process, the set of warnings, or the set of recommendations for presentation to the process administrator of the industrial process. The processor(s) 1010 can also be configured to output a command to at least one element of the plurality of elements of the industrial process to implement the automated response.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
analyzing time-stamp data collected associated with a plurality of elements of an industrial process to generate a set of times associated with each element in the plurality of elements, wherein the industrial process is a production line, wherein the plurality of elements of the industrial process comprises one or more of production stations in the production line and a set of transitions between the production stations, wherein the set of times associated with each element in the plurality of elements relates to a time duration associated with a product passing through the element, and wherein each element in the plurality of elements is associated with a corresponding characteristic time;
generating, based on the set of times associated with each element in the plurality of elements, a color coded visualization of the industrial process, wherein generating the color coded visualization comprises associating, based on the corresponding characteristic time, each of the plurality of elements of the industrial process with a corresponding color indicating a state of an element in the plurality of elements of the industrial process, wherein the state of each element relates to the set of times associated with the element, and wherein the corresponding color indicating the state of the element is selected from a color gradient and times associated with endpoints of the color gradient are based on the corresponding characteristic time; and
presenting, via a display, the color coded visualization of the industrial process.

2. The method of claim 1, wherein a set of threshold times associated with a corresponding set of colors for indicating the state of each element in the plurality of elements is defined, wherein the set of threshold times for each element is based on the corresponding characteristic time for the element.

3. The method of claim 2, wherein each threshold time in the set of threshold times for a particular element is the corresponding characteristic time plus an offset time that is based on a factor multiplied by the corresponding characteristic time.

4. The method of claim 1, wherein the time-stamp data includes data related to each element of the industrial process for a set of products associated with the production line.

5. The method of claim 4, wherein the time-stamp data related to each element of the industrial process comprises a first time-stamp indicating a first time at which the element becomes associated with each product in the set of products and a second time-stamp indicating a second time at which the product is transferred to a next element and the set of times associated with each element in the plurality of elements is corresponding a set of times that a corresponding set of products is associated with the element in the plurality of elements.

6. The method of claim 1, further comprising:
generating, based on the time-stamp data, a prediction as to one or more of a production rate of the industrial process, a production target of the industrial process, or a failure of at least one element of the plurality of elements for presentation along with the color coded visualization of the industrial process.

7. The method of claim 1, wherein the time-stamp data further comprises one or more of machine alarm information, operational characteristics associated with one or more elements in the plurality of elements, first information regarding an environment of the industrial process, or second information regarding an output of the industrial process.

8. The method of claim 1, wherein the color coded visualization of the industrial process comprises one or more of a simplified block model of the plurality of elements of the industrial process wherein each block representing a corresponding element in the plurality of elements is associated with the corresponding color or a digital twin model of the plurality of elements of the industrial process wherein each element in the plurality of elements is overlaid with the corresponding color indicating the state of the element of the industrial process.

9. The method of claim 1, further comprising:
identifying, based on the time-stamp data, one or more of a set of one or more bottlenecks associated with the industrial process, a set of warnings, or a set of recommendations for presentation to a process administrator of the industrial process; and
presenting, along with the color coded visualization of the industrial process, the identified one or more of the set of one or more bottlenecks associated with the industrial process, the set of warnings, or the set of recommendations.

10. The method of claim 9, wherein the one or more of the set of one or more bottlenecks associated with the industrial process, the set of warnings, or the set of recommendations is associated with at least one automated response, the method further comprising:
outputting a command to at least one element of the plurality of elements of the industrial process to implement the at least one automated response.

11. An apparatus comprising:
a memory; and
at least one processor coupled to the memory and, based at least in part on information stored in the memory, the at least one processor is configured to:
analyze time-stamp data collected associated with a plurality of elements of an industrial process to generate a set of times associated with each element in the plurality of elements, wherein the industrial process is a production line, wherein the plurality of elements of the industrial process comprises one or more of production stations in the production line and a set of transitions between the production stations, wherein the set of times associated with each element in the plurality of elements relates to a time duration associated with a product passing through the element, and wherein each element in the plurality of elements is associated with a corresponding characteristic time;

generate, based on the set of times associated with each element in the plurality of elements, a color coded visualization of the industrial process, wherein generating the color coded visualization comprises associating, based on the corresponding characteristic time, each of the plurality of elements of the industrial process with a corresponding color indicating a state of an element in the plurality of elements of the industrial process, wherein the state of each element relates to the set of times associated with the element, and wherein the corresponding color indicating the state of the element is selected from a color gradient and times associated with endpoints of the color gradient are based on the corresponding characteristic time; and present, via a display, the color coded visualization of the industrial process.

12. The apparatus of claim 11, wherein a set of threshold times for each element is based on the corresponding characteristic time for the element, and the corresponding color indicating the state of the element of the industrial process is based on the set of threshold times for the element.

13. The apparatus of claim 11, the at least one processor further configured to:

identify, based on the time-stamp data, one or more of a set of one or more bottlenecks associated with the industrial process, a set of warnings, or a set of recommendations for presentation to a process administrator of the industrial process; and present, along with the color coded visualization of the industrial process, the identified one or more of the set of one or more bottlenecks associated with the industrial process, the set of warnings, or the set of recommendations.

14. The apparatus of claim 13, wherein the one or more of the set of one or more bottlenecks associated with the industrial process, the set of warnings, or the set of recommendations is associated with at least one automated response, the at least one processor further configured to:

output a command to at least one element of the plurality of elements of the industrial process to implement the at least one automated response.

15. A computer-readable medium storing computer executable code, the computer executable code when executed by a processor causes the processor to:

analyze time-stamp data collected associated with a plurality of elements of an industrial process to generate a set of times associated with each element in the plurality of elements, wherein the industrial process is a production line, wherein the plurality of elements of the industrial process comprises one or more of production stations in the production line and a set of transitions between the production stations, wherein the set of times associated with each element in the plurality of elements relates to a time duration associated with a product passing through the element, and wherein each element in the plurality of elements is associated with a corresponding characteristic time;

generate, based on the set of times associated with each element in the plurality of elements, a color coded visualization of the industrial process, wherein generating the color coded visualization comprises associating, based on the corresponding characteristic time, each of the plurality of elements of the industrial process with a corresponding color indicating a state of an element in the plurality of elements of the industrial process, wherein the state of each element relates to the set of times associated with the element, and wherein the corresponding color indicating the state of the element is selected from a color gradient and times associated with endpoints of the color gradient are based on the corresponding characteristic time; and present, via a display, the color coded visualization of the industrial process.

16. The computer-readable medium of claim 15, wherein a set of threshold times for each element is based on the corresponding characteristic time for the element, and the corresponding color indicating the state of the element of the industrial process is based on the set of threshold times for the element.

17. The computer-readable medium of claim 15, that at least one processor further configured to:

identify, based on the time-stamp data, one or more of a set of one or more bottlenecks associated with the industrial process, a set of warnings, or a set of recommendations for presentation to a process administrator of the industrial process, wherein the one or more of the set of one or more bottlenecks associated with the industrial process, the set of warnings, or the set of recommendations is associated with at least one automated response;

present, along with the color coded visualization of the industrial process, the identified one or more of the set of one or more bottlenecks associated with the industrial process, the set of warnings, or the set of recommendations; and output a command to at least one element of the plurality of elements of the industrial process to implement the at least one automated response.

* * * * *